United States Patent [19]
Mitcham et al.

[11] Patent Number: 5,477,415
[45] Date of Patent: Dec. 19, 1995

[54] AUTOMATIC COMPUTER DOCKING STATION HAVING A MOTORIZED TRAY, CAMMED SIDE CONNECTORS, MOTORIZED SIDE CONNECTORS, AND LOCKING AND UNLOCKING GUIDE PINS

[75] Inventors: Larry D. Mitcham; Samuel L. Vinson; Thomas R. Grimm, all of Temple, Tex.

[73] Assignee: Texas Instruments Incorporated, Dallas, Tex.

[21] Appl. No.: 151,225

[22] Filed: Nov. 12, 1993

[51] Int. Cl.⁶ .............................. G06F 1/16; H05K 7/10; H01R 13/64
[52] U.S. Cl. ........................................... 361/686; 439/378
[58] Field of Search ..................... 364/708.1; 439/324, 439/374, 378; 361/679, 683–686; 312/223.2

[56] References Cited

U.S. PATENT DOCUMENTS

| | | | |
|---|---|---|---|
| 5,175,671 | 12/1992 | Sasaki | 361/683 |
| 5,313,596 | 5/1994 | Swindler et al. | 361/686 X |
| 5,323,291 | 6/1994 | Boyle et al. | 361/686 X |
| 5,347,425 | 9/1994 | Herron et al. | 361/608 X |

*Primary Examiner*—Michael W. Phillips
*Attorney, Agent, or Firm*—Robert L. Troike; Richard L. Donaldson

[57] ABSTRACT

An automatic docking station for a portable PC such as a Notebook PC is provided wherein the station includes a housing with external connectors to connect up to a full size monitor and full size keyboard as well as external connectors for connection to a modem and a mouse. The docking station further includes internal connectors coupled to these external connectors and tray for receiving the portable computer. The docking station includes a first drive motor to drive the tray into and out of the docking station so that some of the internal connectors engage and disengage with connectors on the end of a portable PC mounted on the tray. The movement of the tray causes an internal connector mounted on a first side of the docking station to cam into and out of engagement with a connector on a first side of a portable PC mounted on the tray. A second drive motor is provided to drive other internal connectors mounted on a second side of the docking station into and out of engagement with connectors on a second side of a portable PC mounted on the tray. Guide pins which are locked and unlocked in response to the guide pins being in mating holes in the portable PC are provided.

16 Claims, 7 Drawing Sheets

AUTOMATIC COMPUTER DOCKING STATION HAVING A MOTORIZED TRAY, CAMMED SIDE CONNECTORS, MOTORIZED SIDE CONNECTORS, AND LOCKING AND UNLOCKING GUIDE PINS

TECHNICAL FIELD OF THE INVENTION

This invention relates to computer docking station and more particularly to an automatic computer docking station.

BACKGROUND OF THE INVENTION

The growth in the use of Personal Computers marks the present age. Personal computers are not only for the use in desktop computing but also by the use of a notebook or laptop type computer for use when traveling. The use of the two computers, one for the desktop and one for traveling, has created a problem that when the traveler returns to the office the desktop or portable computer now has more recent data in it than did the desktop or office base computer. Also, when one leaves to go on a trip the portable would be behind the desktop computer. Complex systems of lap-link type cables and software haven't developed to speed up the exchange of information from the portable computer to the desktop or base computer. This also, however, results in a problem of trying to know just which computer had the latest and greatest data. The solution is the ability to simply have only a portable computer and use it as a base station with a means referred to as a "docking station" in which the portable computer is mounted to the base station which connects up to a real size keyboard and monitor and to a modem and LAN or local area network. One of the small problems that seems lingering is that with all of the plugs, key/mouse cable, LAN adapters, one could spend a good deal of time just tending to all the hardware to connect and disconnect. The docking station is an idea to simplify all of the hookups, but it still takes manipulation and task just to see if everything gets plugged in right and without bending one of the many connector pins. The current state-of-art docking stations have bus pins at one end in which like a printed circuit card, the CPU is mounted and then manually the other elements are plugged in. This can be a concern with a relatively heavy portable computer and many tiny bus pins. What is really in need is some form of automatic docking station so that one need not be a hardware expert or have certain training and skill and adeptness and take time to hookup the monitor, the keyboard, the cables, and the LAN and check over before turning on the computer system. An automatic system that will automatically hookup correctly, self check and turn on while the user is attending to other activities is highly desirable and when you're ready to leave or go on a trip, it is highly desirable to have a docking station that also appropriately disconnects the portable computer in the manner of ejecting a tape from a VCR so the traveler is ready to go in an instant. Many people who utilize computers do not consider themselves expert in the field of wiring or plugging in equipment. They simply want to put it in something and have it automatically loaded and when leaving to push a button and have the docking station deliver it free to travel.

SUMMARY OF THE INVENTION

In accordance with one preferred embodiments of the present invention, an automatic loading and unloading of a portable type computer in a docking station is provided. The docking station includes a housing with connectors means for coupling to a full size monitor and keyboard. A tray adapted to receive the portable computer is slidably mounted to the housing. A drive means, coupled between the housing and the tray, drive the tray with the portable computer to automatically mate the connection means of the docking station to the portable computer connection means.

DETAILED DESCRIPTION OF THE INVENTION

Figure 1:
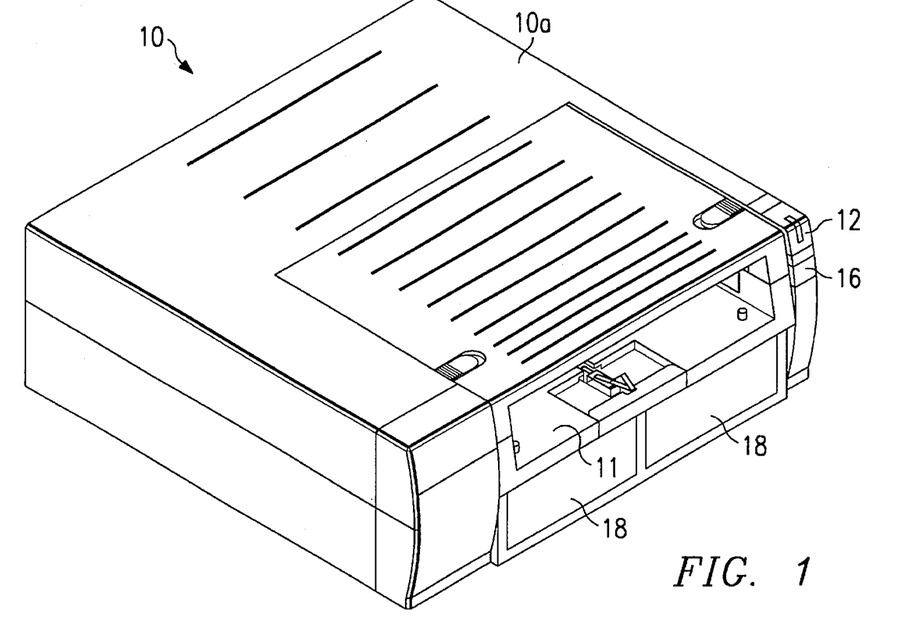
FIG. 1 is a front perspective view of the docking station in accordance with one embodiment of the present invention.

Referring to FIG. 1 there is illustrated the docking station in accordance with the present invention. Docking station 10 includes a slot 11 for receiving a portable computer 13 shown in FIG. 2.

Figure 2:
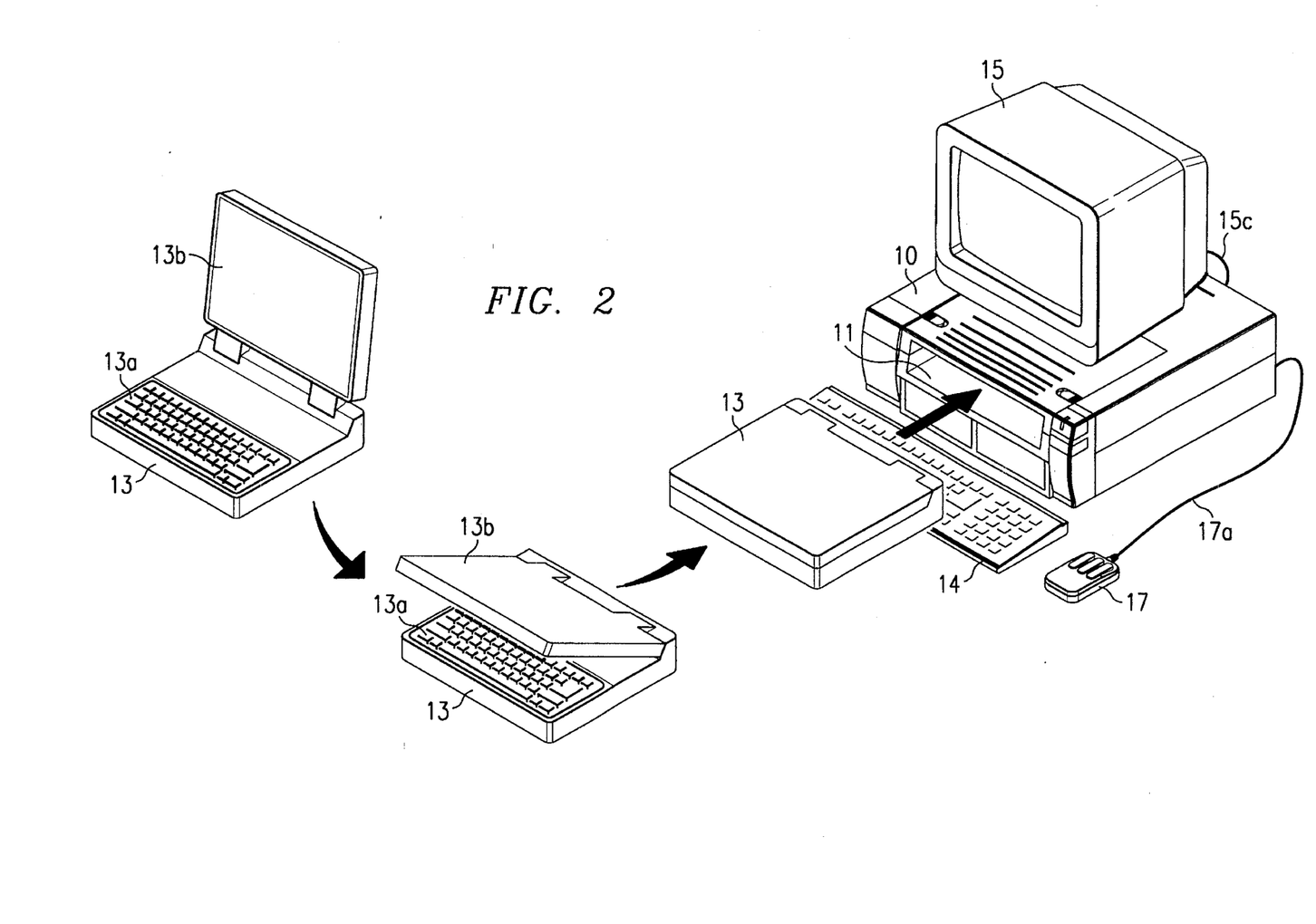
FIG. 2 is a sketch of a portable laptop computer being folded and applied to the docking station of FIG. 1 in accordance with the present invention.
Figure 3:
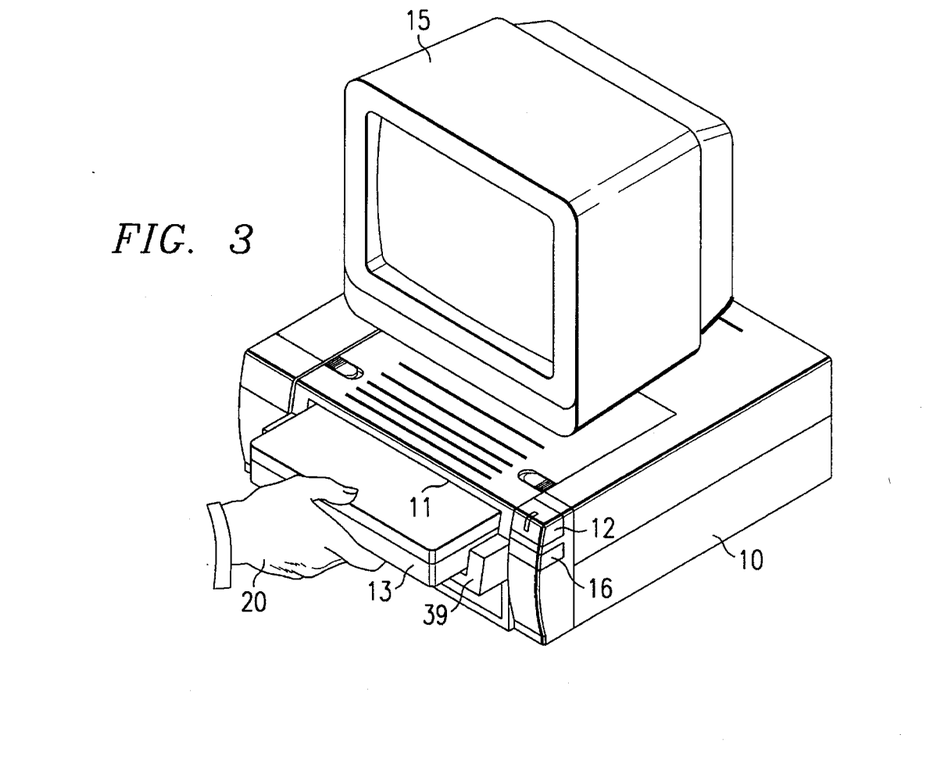
FIG. 3 is a sketch of the docking station of FIG. 1 receiving a portable computer.

FIG. 2 illustrates the progression of a portable laptop or notebook computer 13 from an open position at the left to a partially folded position and after being folded is inserted into the opening or the slot 11 in the docking station 10. The docking station 10 includes a full size monitor 15, a mouse 17, a full size keyboard 14 and further may include, for example a LAN connection not shown. FIG. 3 illustrates a person, illustrated by hand 20 inserting the portable computer 13 in a docking station 10. The docking station 10, of course, further includes the keyboard. In accordance with the present invention, the person merely inserts the portable computer 13 in its folded position on a tray 39 and depresses a button 16 and the computer 13 is driven by the docking station 10 into its enabling position such that the portable computer is hooked up to the CRT display 15, a full-size keyboard 14, power supply, a LAN the network as well as any mouse 17 connection 17a.

Referring again to FIG. 1, the top 10a of the base station 10 is used as a VGA monitor stand. There is the slot 11. There is below the slot 11 two drive bays 18 in which can be placed hard drives, either 3.5" or 5.25." These drive bays 18 may also be used for CD ROMs or tape backup devices. The bottom button 16 on the base station 10 with a standby light, can be used to load or eject the portable PC 13 and there is also a battery charge indicator light 12, since the unit, when plugged in, could be used to also charge the battery in the portable PC unit 13. There is also two PCMCIA type III card slots. The PCMCIA cards can be used to include ethernet and token ring network operations.

Figure 4:
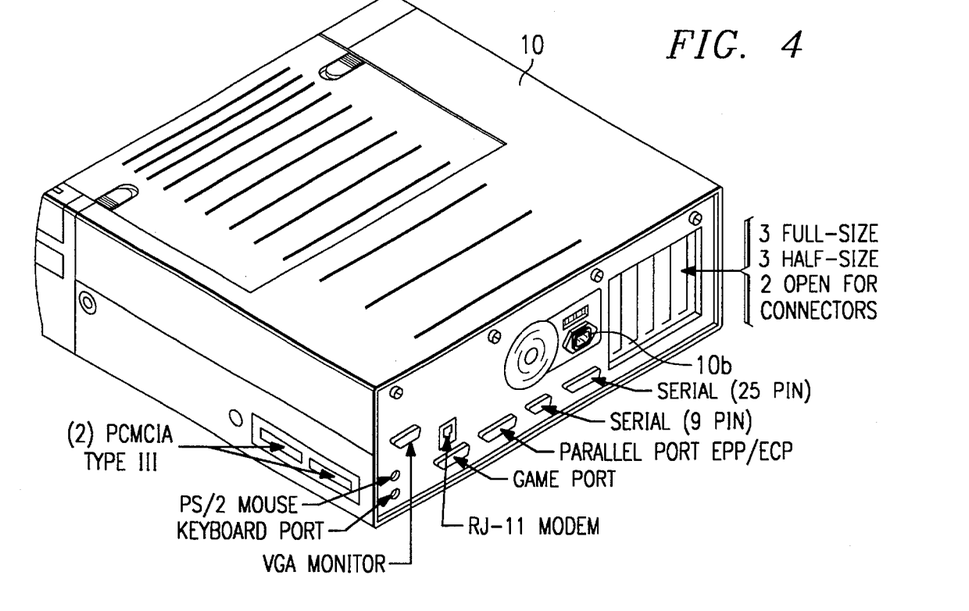
FIG. 4 is a rear view of the docking station of FIG. 1.
Figure 5:
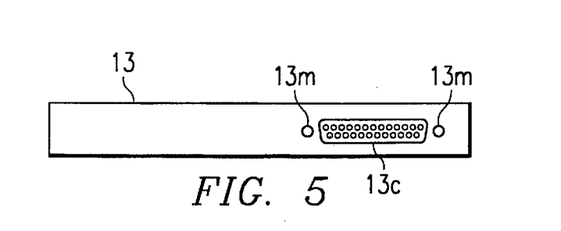
FIG. 5 is a rear view of the portable computer illustrating the bus connector.
Figure 6:
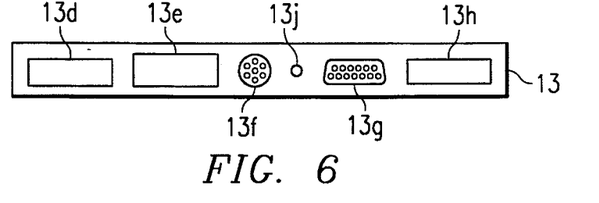
FIG. 6 is a left side view of the portable computer illustrating the connectors.
Figure 7:
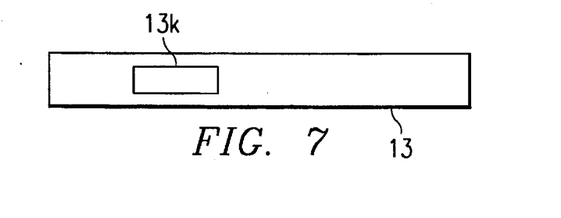
FIG. 7 is a right side view of the portable computer illustrating the mouse connector.

Referring to FIG. 4, there is illustrated a back view of the docking station 10 which shows places for connectors. There is a 25 pin 16550 UART serial port and a 9 pin 16550 UART serial port. There is also a EPP/ECP parallel port. There is also a port for the fullsize keyboard 14. There is another port for the mouse, another for the VGA monitor next to the PCMCIA port. There is also the power plug connector 10b. The portable may be, for example, a TravelMate 4000 Notebook computer made by Texas Instruments. The portable computer 13 as illustrated in FIG. 2, includes a keyboard half 13a and a display half 13b in the cover. On the back or hinged edge of the portable PC 13 there is a bus connector 13c as shown in FIG. 5 which is wired to the keyboard 13a and chargeable power supply. As shown in FIG. 6 on the left side edge of the portable PC 13, there is a connector 13d for the serial bus, a connector 13e for a modem, a mouse connector 13f, a VGA connector 13g and a parallel port bus connector 13h. There is also an alignment pin hole 13j. On the fight edge of the portable CPU 13, there is a mouse connector 13k as shown in FIG. 7 to receive a mouse connector. The mouse connector 13k is a connector pad such as used with the Quick Port connections of Texas Instruments TravelMates. As will be described in connection with the present invention, an automatic docking system will make the connections to the rear bus connector 13c, to the modem connector 13e, to the VGA connector 13g and to the mouse connector 13k of the portable PC 13. The docking station 10 has internal wiring to couple the VGA input from the portable PC 13 connector 13g to the VGA monitor output connector of the base station shown in FIG. 4 to which monitor 15 is connected by the cable 15c (FIG. 2), to couple the modem connector 13e to the modem output on the back of the base station 10 (see FIG. 4), and to couple the mouse connector 13k output through the mouse plug (FIG. 4) and mouse 17 via cable 17a (FIG. 2).

Figure 8:
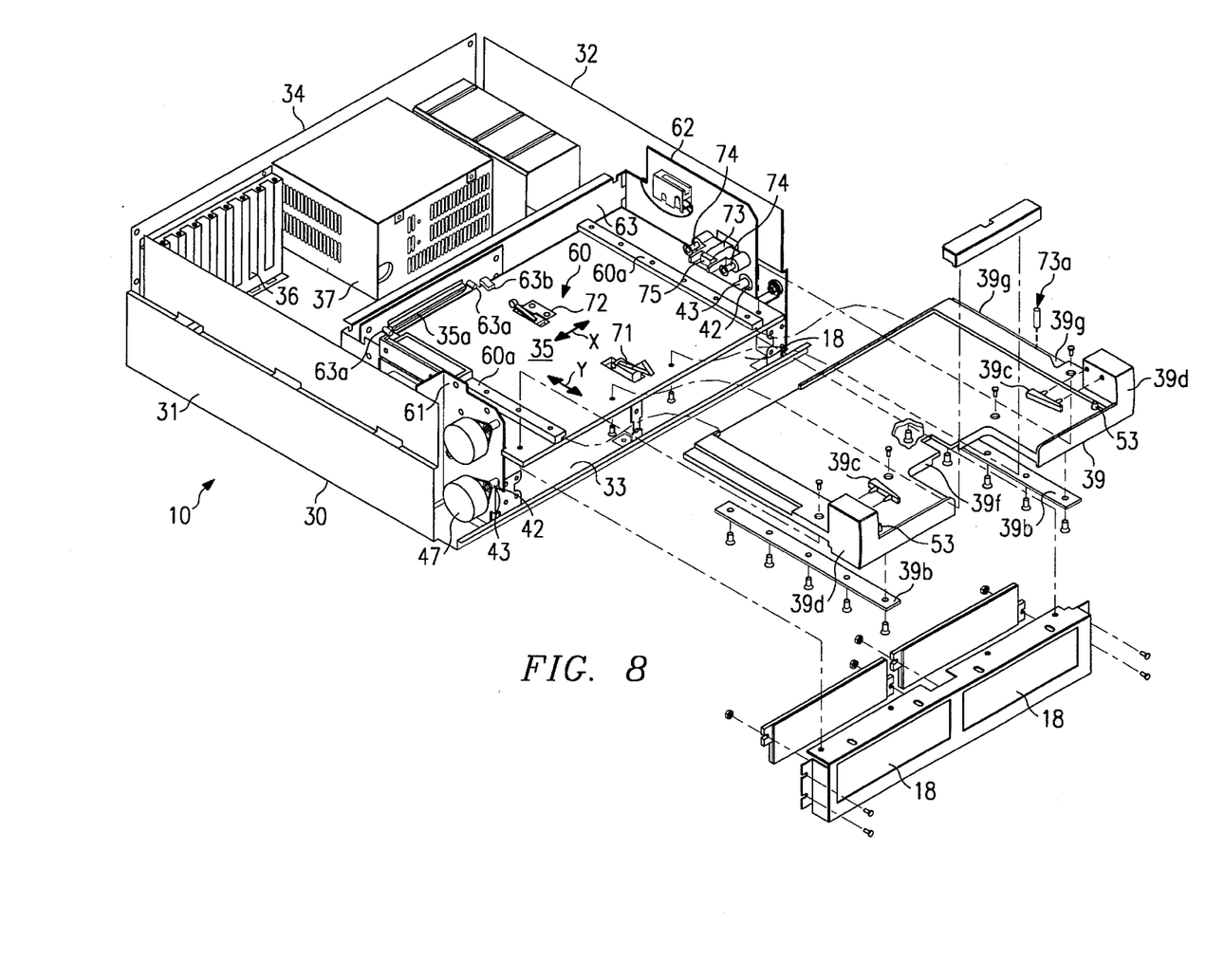
FIG. 8 is an exploded view of the docking station of FIG. 1 with the top cover and front cover removed.

Referring to FIG. 8 there is illustrated the docking unit 10, with the top housing cover 10a and front side wall removed, showing the housing 30 with the left side 31, right side 32, back side wall 34 and bottom 33. A tray section 35 in the housing is the active portion to load and unload the portable computer 13. Behind the tray section 35 there is a section 36 of expansion slots for full size and half size 16 bit ISA card slots, power supply section 37 and other parts of the docking station. As stated previously in the space below the tray section 35, there are bays 18 for putting the hard drives. The tray section 35 includes side walls 61 and 62, back wall 63 mounted to floor 33. A shelf 60 extends between side walls 61 and 62 and back wall 63. A cross shaft 43 extends from left side wall 61 to right side wall 62. This cross shaft 43 is mounted in bearings 42 at the side walls 61 and 62. The system uses two motors. A first motor 47 is connected to the cross shaft 43 for driving a tray 39 in an out of the docking station 10.

Figure 9:
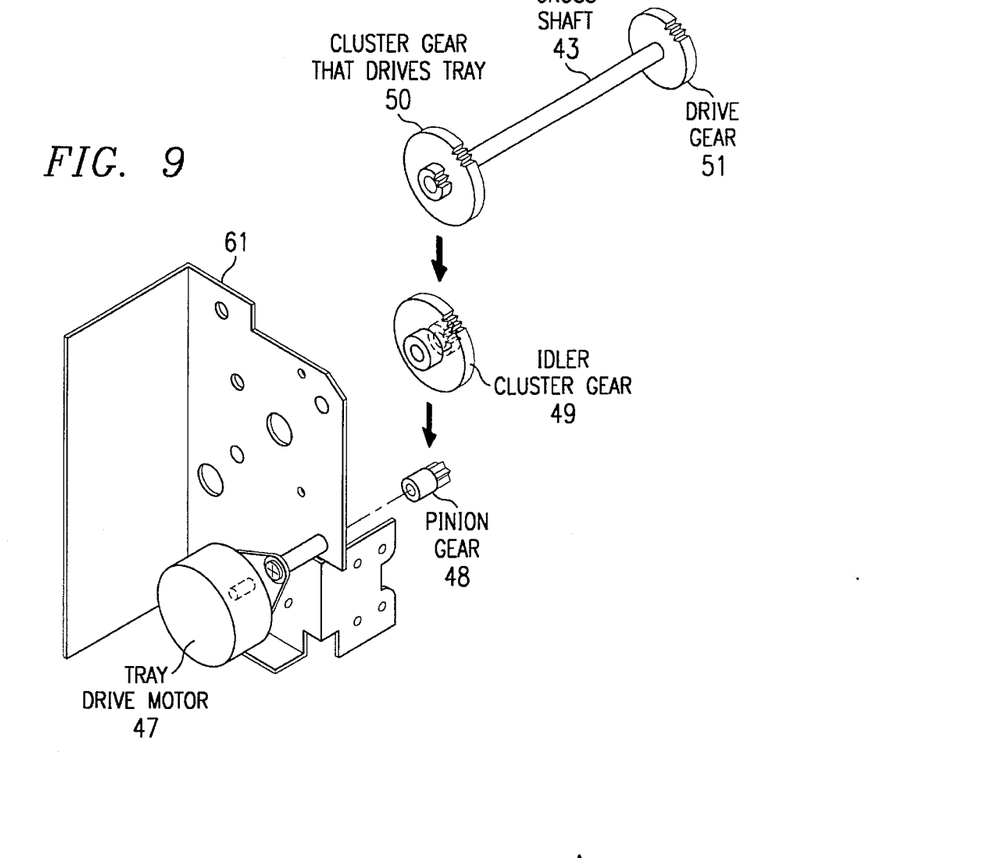
FIG. 9 illustrates the tray drive train for the docking station of FIG. 1.
Figure 10:
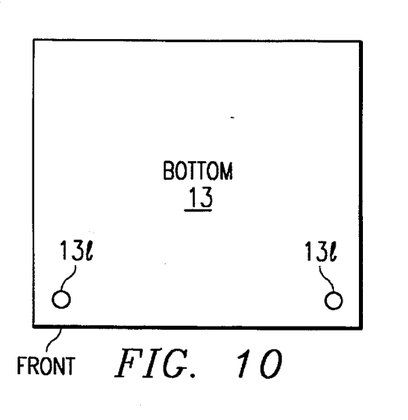
FIG. 10 is a bottom view of the personal computer illustrating the alignment holes.
Figure 11:
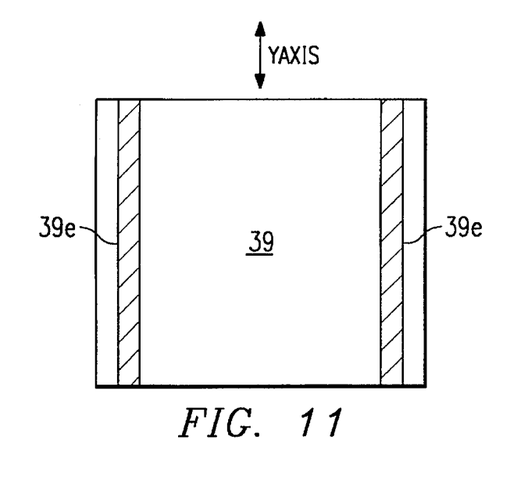
FIG. 11 is a bottom view of the tray of FIG. 9 illustrating the drive racks for the tray.

As illustrated in FIG. 9, the motor 47 is mounted to a pinion gear 48 which in turn drives an idler cluster gear 49, which in turn drives cluster gear 50 that drives tray 39 and the cross shaft 43, that in turn drives the tray 39 via the drive gear 51. The tray 39 slides in the Y-direction over shelf 60. The tray 39 includes pins 53 that index or locate the computer 13 during the mating of the connectors. The bottom of the portable computer 13 includes holes 131 that match the pins 53 as shown in FIG. 10. The drive gears 50 and 51 on each end of the shaft 43 mate intimately with integral racks 39e in the tray structure 39 at the bottom. As shown in FIG. 11 racks 39e extend in the Y-direction engage gears 50 and 51. The tray 39 is confined to a linear motion via guides 39b on the tray 39 that slide under guides 60a on the shelf 60. The guides are collinear with the rack access and normal to the cross shaft 43. There are cut outs in the shelf 60 such that the racks 39e at the bottom of the tray 39 will mate with the gears 50 and 51 at each end of the shaft 43. The tray 39 also has side guides 39c on side posts 39d which are broad to narrowing wedges illustrated at opposite ends at the front of the tray. Front and back switches 71 and 72 in openings in the shelf 60 and tray 39 aid in controlling the drive motor 47. First the presence of the portable computer 13 on the tray 39 is indicated by the closing by depression the front switch 71 which extends through notch 39f in tray 39. When the tray reaches the position of switch 72, the drive motor 47 is slowed down and step controlled to aid in connecting the bus connector 13c to a mating bus connector 35a in rear wall 63 by stepping the motor 47 so that the rear bus pins of the connector 13c match with the bus sockets of connector 35a of the docking station 10. At the rear wall 63 of the tray section 35, on either side of the bus pin connector 35a, there are pins 63a that are spring loaded and locked in the extended position that match with aligned holes 13m (FIG. 5) in the personal computer 13 on either of the bus connector 13c. As the computer 13 is driven by the tray 39, the pins 63a extend into these appatures 13m. A switch with a spring loaded extension 63b extends from the rear wall 63 so that when it touches the rear of the computer PC 13 releases the locked pins 63a and the drive motor 47 is stepped according to the position of the drive tray 39 to mate the rear connector 35a to the bus pins 13c of the computer PC 13. Stop sensors aid in starting, running and stopping the drive chain motor 47 during the docking operation.

Also molded on the tray 39 is a cam edge 39g with a notch that extends in the X-axis direction toward the center of the tray 39. A spring mounted mouse connector mechanism 73 is mounted on the side wall 62 of the tray section 35. The mechanism 73 includes a mouse connector 75 and a cam follower or pin 73a that extends from spring mounted connector mechanism 73. The mechanism 73 is mounted along a pair of shafts 74, such that as the tray 39 moves in the housing 10 the cam follower 73a follows the edge 39g of the tray and when it reaches the portion of the X-axis notch the springs on the shaft 74 push the connector mechanism 73 laterally and move the connector 75 for the mouse into the side of the computer PC 13 at connector 13k in FIG. 7.

Figure 12:
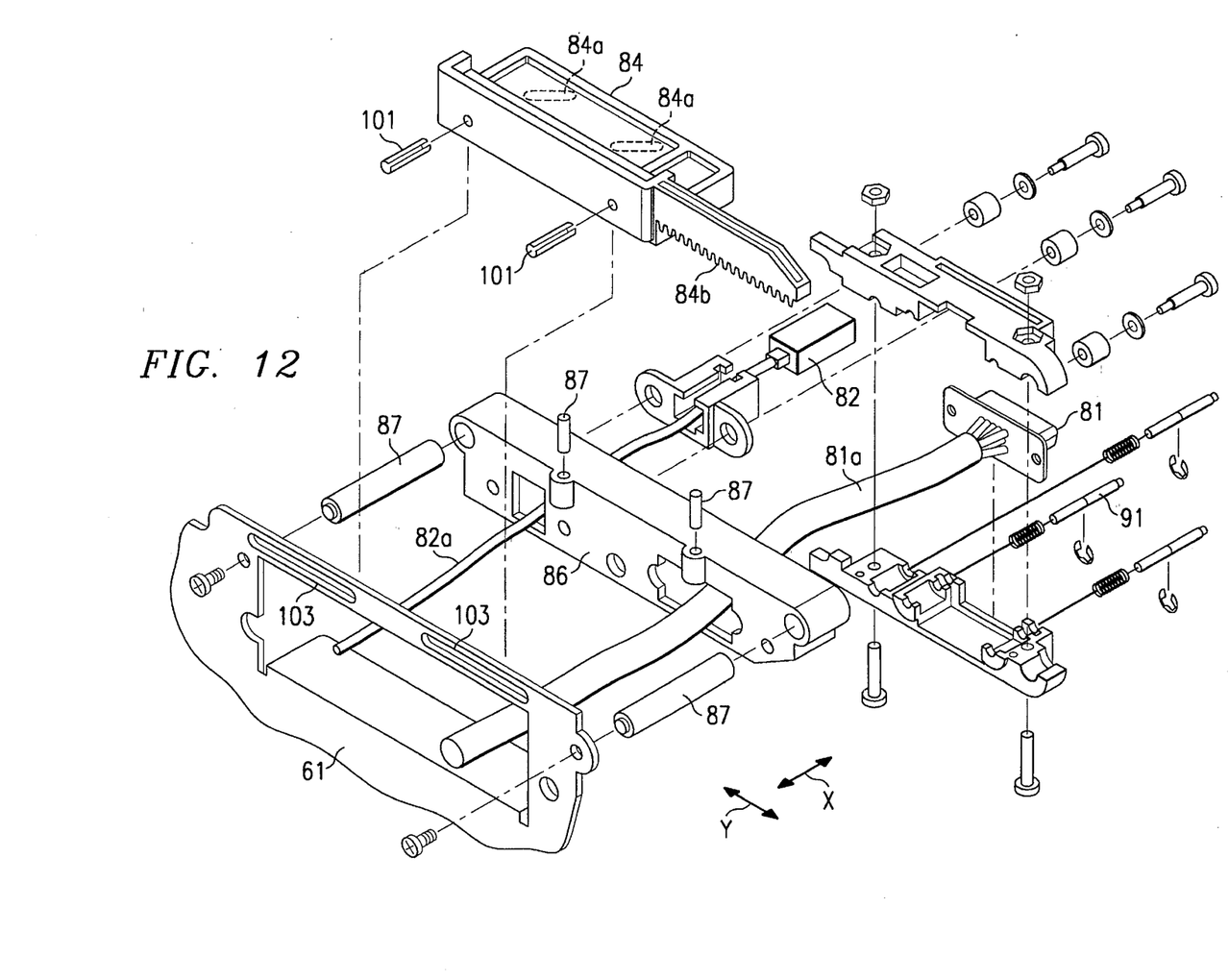
FIG. 12 is an exploded view of the X-axis drive connector mechanisms of the docking station of FIG. 1.

In addition to a Y-axis drive, the docking station 10 is equipped with a side or X-axis drive capability to make connections with the side connectors 13e and 13g on the portable computing device 13. In particular these side connectors are the modem connector 13e and VGA connector 13g on the left side of the portable computing device 13. Referring to FIG. 12 horizontal moving connector holder 86 movable in the X-axis direction is mounted on two rods 87 which are rigidly attached to side wall 61 of section 35. The modem connector 82 and VGA connector 81 shown are mounted to the holder 86 and slide with the holder 86. The cables 82a and 81a are coupled to the connector 82 and 81 at one end and to the modem and VGA connectors on the back and side of the docking station 10 as shown in FIG. 4.

Figure 13:
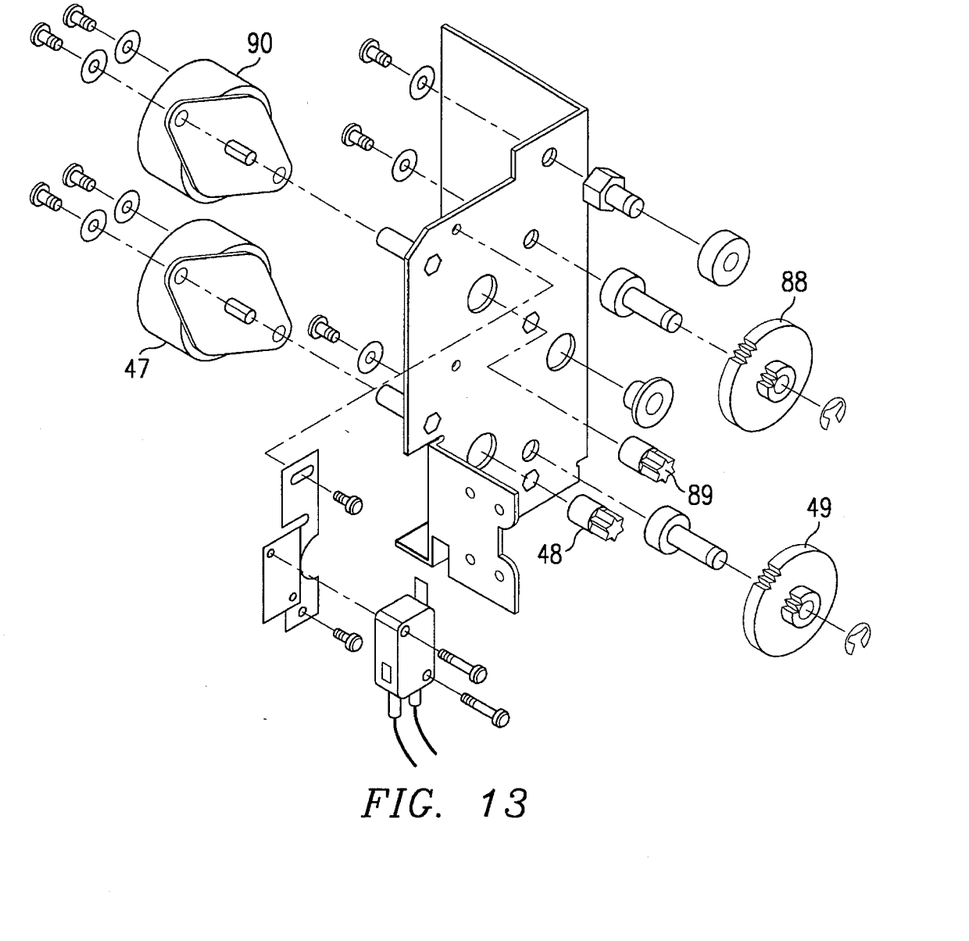
FIG. 13 is an exploded view of the drive motors and mounting of the docking station of FIG. 1.

A rack/cam plate 84 is mounted to this laterally moving holder 86 via follower pins 87 which slide in inclined slots or groves 84a mounted in the lower surface of the traversing rack/cam plate 84. The rack/cam plate 84 is also guided by pin 101 in slots 103 in wall 61. The rack/cam plate 84 includes at one end thereof a rack 84b. This rack/cam plate 84 is mated at rack 84b to a cluster gear 88, which is coupled to gear 89 which is driven by the second drive motor 90 as shown in FIG. 13. The result in linear motion from the rack cam plate 84 being the driven by the cluster gear 88 moves the cam plate 84 in the Y-axis direction also parallel to the tray 39 mechanism. The inclined slots 84a in the rack/cam plate 84 convert this via pins 87 to X-axis motion to move holder 86 to plug and unplug the side connectors 13e and 13g on a computer 13. Spring loaded guide pin 91 is aligned with holes 13j in portable PC 13 as shown in FIG. 6. Thus, this docking device automatically connects up, fully automatic, in bi-axial connector directions.

In the operation of the system, the drive motor 47 first drives in the Y-axis direction to mate connector halves 35a and 13c with the rear connector and connector halves 13k and 74 and then following thereafter the other motor 90 is energized which then drives the side connectors 81 and 82. When the unit is to be disconnected and the computer is to be ejected, first the side access connectors 81 and 82 are pulled back and then the drive motor 47 drives the tray out with the computer 13. Where mating connectors are described one of the connectors is a connector half that is either male or female while the other connector is a mating connector half of female or male respectively.

What is claimed is:

1. An automatic docking station for a portable computer comprising:

a housing for holding a portable computer therein, said housing having connection means for coupling a computer monitor and a keyboard, a tray adapted to receive said portable computer thereon, said tray being slidably mounted to said housing, a tray driver coupled between said housing and said tray for driving said tray and said portable computer into and out of said housing and automatically mating said connection means of said housing to connection means on said portable computer, and said tray driver including a drive mechanism including a drive motor and gear means coupled to said drive motor and said tray includes a rack means on the bottom of said tray and said gear means is coupled to said rack means to drive said tray.

2. An automatic docking station for a portable computer having first and second connection means comprising:

a housing for holding said portable computer therein, said housing having connection means for coupling a computer monitor and a keyboard, said connection means including first and second connecting means, a tray adapted to receive said portable computer thereon, said tray being slidably mounted to said housing, and drive means coupled between said housing and said tray for driving said tray and said portable computer into and out of said housing and automatically mating said first connecting means of said housing to said first connection means on said portable computer; and said drive means includes a first drive mechanism for driving said tray in a first direction and a second drive mechanism coupled to a first connector system of said connection means on said housing for driving said first connector system in a second direction orthogonal to said first direction to mate or unmate with said second connection means on said portable computer.

3. The docking station of claim 2 wherein said first drive mechanism includes a first drive motor and gear means coupled to said drive motor and said tray includes a rack means on the bottom of said tray and said gear means is coupled to said rack means to drive said tray.

4. The docking station of claim 3 wherein said second drive mechanism includes a second drive motor and a second gear means and said first connector system includes a connector holder means slidably mounted in said second orthogonal direction having pins therein extending into a rack/cam plate and a rack portion of said rack/cam plate is coupled to said second gear means.

5. The docking station of claim 1 wherein said housing includes a housing connector bus half for connection to a connector bus half in said personal computer when said personal computer on said tray is driven in said first direction by said first drive mechanism and said first drive mechanism includes means for sensing when said tray with said personal computer is near said housing connector bus half and for stepping said first drive motor slowly and wherein said housing includes guide means for guiding said personal computer so said bus halves mate.

6. The docking station of claim 5 wherein said guide means includes guide pins on either side of said housing connector bus half and said personal computer includes alignment holes on either side of said personal computer bus half.

7. An automatic docking station for a portable computer comprising:

a housing for holding a portable computer therein, said housing having connection means for coupling a computer monitor and a keyboard, a tray adapted to receive said portable computer thereon, said tray being slidably mounted to said housing, and drive means coupled between said housing and said tray for driving said tray and said portable computer into and out of said housing and automatically mating said connection means of said housing to connection means on said portable computer;

said housing includes a connector bus half for connection to a connector bus half in said personal computer when said personal computer is driven in said first direction and said first drive means includes means for indicating when said tray with said personal computer is near said housing connector bus half for stepping said drive means slowly and wherein said housing includes guide means for guiding said computer so said bus halves mate;

said guide means includes guide pins on either side of said housing connector bus half and said personal computer includes alignment holes on either side of said personal computer bus half; and said guide means includes means for locking and unlocking said guide pins and means responsive to the personal computer being and the tray being such that the guide pins are in the holes for unlocking said pins allowing the first drive motor to continue stepping the bus halves together.

8. The docking station of claim 7 including switch means indicating the presence of said personal computer on said tray.

9. The docking station of claim 8 wherein said tray has alignment pins to mate with corresponding alignment holes on said personal computer.

10. The docking station of claim 9 wherein said tray has means located on the sides thereof to channel said portable computer into alignment with the docking station.

11. An automatic docking station for a portable computer comprising:

a housing for holding a portable computer therein, a tray adapted to receive said portable computer thereon, said tray being slidably mounted to said housing, and drive means coupled between said housing and said tray for driving said tray and, said portable computer into and out of said housing; and said tray includes a tray camming means along one side thereof and a spring mounted connector on said housing with a pin means is coupled to said tray camming means for coupling said connector to the side of said personal computer when said tray moves said computer into said housing.

12. The docking station of claim 1 wherein said drive mechanism includes a pair of spaced racks on the bottom of said tray near opposite end thereof and said gear means includes a cross shaft orthogonal to said racks with drive gears thereon, near each end driving said racks to drive the tray into and out of said housing.

13. The docking station of claim 12 including guides on said tray sliding under guides on said housing, said guides extending in the same direction as said racks.

14. An automatic docking station for a portable computer having a connector on a first side thereof comprising:

a housing for holding said portable computer therein, said housing having a first connection means;

a tray adapted to receive said portable computer thereon, said tray being slidably mounted to said housing;

first drive means coupled between said housing and said tray for driving said tray and said portable computer into and out of said housing in a first direction; and a second drive mean coupled to said first connection means for driving said first connection means in a direction orthogonal to said first direction automatically mating said first connection means of said housing to said connector on a side of said portable computer.

15. The docking station of claim 14 wherein said computer has a second connector means at an end in the direction of travel of said tray going into said housing wherein when said tray is driven into said housing said second connector means mates with a second connection means in said housing.

16. The docking station of claim 15 wherein said computer has a third connector on a side opposite said first side and a third drive means coupled to a third connection means on said housing and said tray for driving said third connection means to mate with said third connector means on said computer when said tray is driven into said housing.

\* \* \* \* \*